(12) United States Patent
Espeland et al.

(10) Patent No.: US 12,053,908 B2
(45) Date of Patent: Aug. 6, 2024

(54) METHOD AND SYSTEM FOR RECYCLING WIND TURBINE BLADES

(71) Applicant: ReGen Fiber, LLC, Cedar Rapids, IA (US)

(72) Inventors: John Espeland, Des Moines, IA (US); Michael Olson, Ankeny, IA (US); Troy Wright, Johnston, IA (US)

(73) Assignee: REGEN FIBER, LLC, Cedar Rapids, IA (US)

( * ) Notice: Subject to any disclaimer, the term of this patent is extended or adjusted under 35 U.S.C. 154(b) by 364 days.

(21) Appl. No.: 17/512,233

(22) Filed: Oct. 27, 2021

(65) Prior Publication Data

US 2022/0242009 A1 Aug. 4, 2022

Related U.S. Application Data

(60) Provisional application No. 63/144,128, filed on Feb. 1, 2021.

(51) Int. Cl.
*B02C 23/38* (2006.01)
*B02C 19/00* (2006.01)
(Continued)

(52) U.S. Cl.
CPC ............ *B29B 17/02* (2013.01); *B02C 19/00* (2013.01); *B02C 23/38* (2013.01);
(Continued)

(58) Field of Classification Search
CPC .......... B29B 17/02; B29B 17/04; B02C 23/38
See application file for complete search history.

(56) References Cited

U.S. PATENT DOCUMENTS

| 4,515,907 A | 5/1985 | Mccullough et al. |
| 6,428,892 B2 | 8/2002 | Matsuhisa et al. |

(Continued)

FOREIGN PATENT DOCUMENTS

| CN | 205308490 U | 6/2016 |
| CN | 105381845 B | 7/2018 |

(Continued)

OTHER PUBLICATIONS

ISA/US, "International Search Report and Written Opinion", for Application No. PCT/US21/57668, Jan. 31, 2022. 6 pages.

(Continued)

*Primary Examiner* — Faye Francis
(74) *Attorney, Agent, or Firm* — Perkins Coie LLP

(57) ABSTRACT

A method and system for recycling wind turbine blades. A scalper scalps off balsa wood and foam from recycled composite chips, a lump breaker shatters the chips produced by the scalper, a hammer mill breaks fiber chips produced by the lump breaker to reduce the chips to strand clusters, a vibratory screen and cyclone air classifier or circular vibratory screener separate strand clusters of acceptable size from larger strand clusters that require repeated processing with a hammer mill, another vibratory screen and cyclone air classifier or circular vibratory screener further separate strand clusters of acceptable size from larger strand clusters that require repeated processing with a hammer mill, and a granulator pulverizes the resulting fiber strand into microfibers that can be used as reinforcement fibers.

18 Claims, 8 Drawing Sheets

(51) Int. Cl.
  *B29B 17/02* (2006.01)
  *B29K 309/08* (2006.01)
  *B29K 511/14* (2006.01)
  *B29L 31/08* (2006.01)

(52) U.S. Cl.
  CPC ............... *B29B 2017/0227* (2013.01); *B29B 2017/0231* (2013.01); *B29K 2309/08* (2013.01); *B29K 2511/14* (2013.01); *B29L 2031/085* (2013.01)

(56) References Cited

U.S. PATENT DOCUMENTS

| | | |
|---|---|---|
| 6,670,404 B2 | 12/2003 | Martel et al. |
| 6,752,336 B1 | 6/2004 | Wingard |
| 7,153,576 B2 | 12/2006 | Wang et al. |
| 7,267,868 B2 | 9/2007 | Gallet et al. |
| 7,357,726 B2 | 4/2008 | Thorning |
| 7,473,385 B2 | 1/2009 | Stiesdal et al. |
| 7,635,099 B1 | 12/2009 | Meredith et al. |
| 7,709,582 B2 | 5/2010 | Kouchi et al. |
| 7,784,719 B1 | 8/2010 | Wingard |
| 7,799,713 B2 | 9/2010 | Hofmann et al. |
| 7,824,770 B2 | 11/2010 | Honma et al. |
| 7,922,871 B2 | 4/2011 | Price et al. |
| 7,927,077 B2 | 4/2011 | Olson |
| 7,963,747 B2 | 6/2011 | Cairo |
| 7,988,423 B2 | 8/2011 | Hancock |
| 8,080,288 B2 | 12/2011 | Van |
| 8,129,018 B2 | 3/2012 | Hartman et al. |
| 8,192,169 B2 | 6/2012 | Piasecki |
| 8,309,227 B2 | 11/2012 | Hitoe et al. |
| 8,361,358 B2 | 1/2013 | Wolf |
| 8,402,652 B2 | 3/2013 | Bakhuis et al. |
| 8,404,208 B2 | 3/2013 | Kambara et al. |
| 8,486,518 B2 | 7/2013 | Takano et al. |
| 8,501,323 B2 | 8/2013 | Wehner |
| 8,511,996 B2 | 8/2013 | Llorente et al. |
| 8,586,491 B2 | 11/2013 | Hofmann et al. |
| 8,708,259 B2 | 4/2014 | Lindsey et al. |
| 8,770,940 B2 | 7/2014 | Rajamani |
| 8,808,491 B2 | 8/2014 | Sørensen |
| 8,851,384 B2 | 10/2014 | Iwamoto |
| 8,852,732 B2 | 10/2014 | Tadepalli et al. |
| 8,863,809 B2 | 10/2014 | George et al. |
| 8,883,938 B2 | 11/2014 | Kobayashi et al. |
| 8,900,493 B2 | 12/2014 | Meier |
| 8,900,671 B2 | 12/2014 | Lin et al. |
| 8,919,681 B1 | 12/2014 | Horton et al. |
| 8,957,532 B2 | 2/2015 | Takahashi et al. |
| 8,967,976 B2 | 3/2015 | Pascual et al. |
| 8,985,487 B2 | 3/2015 | Kim et al. |
| 9,028,731 B2 | 5/2015 | Weyant et al. |
| 9,033,659 B2 | 5/2015 | Fuglsang et al. |
| 9,039,952 B2 | 5/2015 | Jones |
| 9,061,447 B2 | 6/2015 | Mironov |
| 9,073,270 B2 | 7/2015 | Bech |
| 9,102,564 B2 | 8/2015 | Druart et al. |
| 9,132,430 B2 | 9/2015 | Lofts et al. |
| 9,149,747 B2 | 10/2015 | Kitano |
| 9,156,035 B1 | 10/2015 | Horton et al. |
| 9,187,361 B2 | 11/2015 | Mcginnis et al. |
| 9,212,236 B2 | 12/2015 | Cho et al. |
| 9,290,609 B2 | 3/2016 | Kramer et al. |
| 9,291,151 B2 | 3/2016 | Mironov |
| 9,388,270 B2 | 7/2016 | Van Der Woude et al. |
| 9,394,196 B2 | 7/2016 | Peters et al. |
| 9,421,742 B2 | 8/2016 | Grove-Nielsen |
| 9,427,897 B2 | 8/2016 | Versolato et al. |
| 9,440,239 B1 | 9/2016 | Horton et al. |
| 9,452,569 B2 | 9/2016 | Tadepalli et al. |
| 9,481,789 B2 | 11/2016 | Ichino et al. |
| 9,498,923 B2 | 11/2016 | Hesse |
| 9,499,432 B2 | 11/2016 | Yves et al. |
| 9,505,033 B2 | 11/2016 | Bissonnette |
| 9,677,196 B2 | 6/2017 | Rovellini |
| 9,751,277 B2 | 9/2017 | Jacobsen et al. |
| 9,758,423 B2 | 9/2017 | Cao et al. |
| 9,764,361 B2 | 9/2017 | Valerio |
| 9,765,194 B2 | 9/2017 | Arai et al. |
| 9,789,516 B2 | 10/2017 | Andersen et al. |
| 9,834,474 B2 | 12/2017 | Masson et al. |
| 9,840,041 B2 | 12/2017 | Hallander et al. |
| 9,878,500 B2 | 1/2018 | Schmitt et al. |
| 9,890,499 B2 | 2/2018 | Yamagami |
| 9,909,235 B2 | 3/2018 | Korzhenko et al. |
| 9,957,378 B2 | 5/2018 | Gleich et al. |
| 9,963,576 B2 | 5/2018 | Tsuchiya et al. |
| 9,970,138 B2 | 5/2018 | Linnet et al. |
| 9,975,987 B2 | 5/2018 | Hayashi et al. |
| 10,035,301 B2 | 7/2018 | Bergstrom et al. |
| 10,072,358 B2 | 9/2018 | Da Cruz et al. |
| 10,100,807 B2 | 10/2018 | Spencer et al. |
| 10,107,258 B2 | 10/2018 | Quiring et al. |
| 10,138,593 B2 | 11/2018 | Ichikawa et al. |
| 10,144,184 B2 | 12/2018 | Miyao et al. |
| 10,150,273 B2 | 12/2018 | Baldwin et al. |
| 10,202,501 B2 | 2/2019 | Tadepalli et al. |
| 10,208,173 B2 | 2/2019 | Hiasa et al. |
| 10,227,470 B2 | 3/2019 | Li et al. |
| 10,273,349 B2 | 4/2019 | Ito et al. |
| 10,279,336 B2 | 5/2019 | Kitamura et al. |
| 10,294,142 B2 | 5/2019 | Zhang et al. |
| 10,329,189 B2 | 6/2019 | Zhang et al. |
| 10,330,074 B2 | 6/2019 | Jorgensen et al. |
| 10,343,351 B2 | 7/2019 | Zhang et al. |
| 10,369,575 B2 | 8/2019 | Grasso et al. |
| 10,391,677 B2 | 8/2019 | Bentaj et al. |
| 10,407,553 B2 | 9/2019 | Block et al. |
| 10,487,191 B2 | 11/2019 | Maxey |
| 10,501,605 B2 | 12/2019 | Ichikawa et al. |
| 10,507,598 B2 | 12/2019 | Ahmed |
| 10,544,275 B2 | 1/2020 | Hiasa et al. |
| 10,584,219 B2 | 3/2020 | Bae et al. |
| 10,647,610 B2 | 5/2020 | Peters et al. |
| 10,669,189 B2 | 6/2020 | Zhang et al. |
| 10,669,402 B2 | 6/2020 | Tadepalli et al. |
| 10,675,661 B2 | 6/2020 | Laitt |
| 10,696,581 B2 | 6/2020 | Zhang et al. |
| 10,696,815 B2 | 6/2020 | Zhang et al. |
| 10,723,090 B2 | 7/2020 | Nielsen et al. |
| 10,723,954 B2 | 7/2020 | Gehr |
| 10,730,271 B2 | 8/2020 | Zhang et al. |
| 10,752,748 B2 | 8/2020 | Liang et al. |
| 10,780,609 B2 | 9/2020 | Zhang et al. |
| 10,792,668 B1 | 10/2020 | Bacon |
| 10,821,427 B2 | 11/2020 | Bedard et al. |
| 10,822,463 B2 | 11/2020 | Takehara et al. |
| 10,822,467 B2 | 11/2020 | Yue et al. |
| 10,829,603 B2 | 11/2020 | Nomura et al. |
| 10,829,612 B2 | 11/2020 | Qi et al. |
| 10,829,633 B2 | 11/2020 | Lehman et al. |
| 10,875,213 B2 | 12/2020 | Guha et al. |
| 10,875,214 B2 | 12/2020 | Paspek et al. |
| 10,899,042 B2 | 1/2021 | Gehr et al. |
| 10,913,875 B2 | 2/2021 | Malofsky et al. |
| 10,920,031 B2 | 2/2021 | Harada et al. |
| 10,953,407 B2 | 3/2021 | Lilly et al. |
| 10,953,569 B2 | 3/2021 | Prins et al. |
| 10,961,348 B2 | 3/2021 | Capelot et al. |
| 10,961,362 B2 | 3/2021 | Capelot et al. |
| 11,034,816 B2 | 6/2021 | Li et al. |
| 2004/0173239 A1 | 9/2004 | Grove-nielsen |
| 2007/0017255 A1 | 1/2007 | Grove-Nielsen |
| 2007/0036958 A1 | 2/2007 | Hagemann et al. |
| 2008/0152574 A1 | 6/2008 | Tanaka et al. |
| 2009/0023853 A1 | 1/2009 | Tsukada et al. |
| 2009/0226712 A1 | 9/2009 | Handa et al. |
| 2009/0321511 A1 | 12/2009 | Browne |
| 2010/0047153 A1 | 2/2010 | Plee |
| 2010/0122459 A1 | 5/2010 | Suffield |
| 2010/0267868 A1 | 10/2010 | Takahashi et al. |
| 2011/0033646 A1 | 2/2011 | Shafi et al. |
| 2011/0052403 A1 | 3/2011 | Kawasetsu et al. |

(56) References Cited

U.S. PATENT DOCUMENTS

| | | |
|---|---|---|
| 2011/0104490 A1 | 5/2011 | Kambara et al. |
| 2011/0114252 A1 | 5/2011 | Partington et al. |
| 2011/0198013 A1 | 8/2011 | Christiansen et al. |
| 2011/0221093 A1 | 9/2011 | Perrow et al. |
| 2011/0263728 A1 | 10/2011 | Chang |
| 2011/0301287 A1 | 12/2011 | Weyant et al. |
| 2011/0316182 A1 | 12/2011 | Mortensen |
| 2011/0319564 A1 | 12/2011 | Corley et al. |
| 2013/0040151 A1 | 2/2013 | Jeromerajan et al. |
| 2013/0178559 A1 | 7/2013 | Nakai et al. |
| 2013/0192434 A1 | 8/2013 | Hashimoto et al. |
| 2013/0196154 A1 | 8/2013 | Ortlepp et al. |
| 2014/0227928 A1 | 8/2014 | Ehbing et al. |
| 2014/0288213 A1 | 9/2014 | Grove-nielsen |
| 2015/0010760 A1 | 1/2015 | Fukuda et al. |
| 2015/0132553 A1 | 5/2015 | Fukuda et al. |
| 2015/0148485 A1 | 5/2015 | Yohannes et al. |
| 2015/0251394 A1 | 9/2015 | Fukuda et al. |
| 2015/0375462 A1 | 12/2015 | Kirkegaard |
| 2016/0083544 A1 | 3/2016 | Osaka et al. |
| 2016/0102182 A1 | 4/2016 | Zhang et al. |
| 2016/0177084 A1 | 6/2016 | Hamada et al. |
| 2016/0312762 A1 | 10/2016 | Quiring et al. |
| 2016/0326301 A1 | 11/2016 | Mason et al. |
| 2017/0157801 A1 | 6/2017 | Yang et al. |
| 2017/0166742 A1 | 6/2017 | Hoover et al. |
| 2017/0190621 A1 | 7/2017 | Sarja |
| 2017/0198416 A1 | 7/2017 | Zhao et al. |
| 2017/0203384 A1 | 7/2017 | Zhao et al. |
| 2017/0239895 A1 | 8/2017 | Takehara et al. |
| 2017/0240714 A1 | 8/2017 | Ahmed et al. |
| 2017/0350040 A1 | 12/2017 | Ijuin |
| 2018/0044489 A1 | 2/2018 | Takehara et al. |
| 2018/0244874 A1 | 8/2018 | Lehman et al. |
| 2018/0244879 A1 | 8/2018 | Takehara et al. |
| 2018/0272625 A1 | 9/2018 | Moroiwa et al. |
| 2018/0291161 A1 | 10/2018 | Zhang et al. |
| 2018/0346668 A1 | 12/2018 | Ichikawa et al. |
| 2018/0347541 A1 | 12/2018 | Kudsk |
| 2019/0054706 A1 | 2/2019 | Takehara et al. |
| 2019/0066062 A1 | 2/2019 | Lilly et al. |
| 2019/0070680 A1 | 3/2019 | Lilly et al. |
| 2019/0070829 A1 | 3/2019 | Miura et al. |
| 2019/0153178 A1 | 5/2019 | Hochstetter et al. |
| 2019/0161594 A1 | 5/2019 | Li et al. |
| 2019/0217504 A1 | 7/2019 | Wang |
| 2019/0218361 A1 | 7/2019 | Wang |
| 2019/0240934 A1 | 8/2019 | Prins et al. |
| 2019/0241735 A1 | 8/2019 | Zierer et al. |
| 2019/0264353 A1 | 8/2019 | Ban et al. |
| 2019/0283279 A1 | 9/2019 | Kasai et al. |
| 2019/0337200 A1 | 11/2019 | Baker |
| 2020/0002619 A1 | 1/2020 | Sui et al. |
| 2020/0016641 A1 | 1/2020 | Agrawal |
| 2020/0018283 A1 | 1/2020 | Bozsak et al. |
| 2020/0056005 A1 | 2/2020 | Arai et al. |
| 2020/0061725 A1 | 2/2020 | Lilly |
| 2020/0094443 A1 | 3/2020 | Schäfer et al. |
| 2020/0095867 A1 | 3/2020 | Schibsbye |
| 2020/0140315 A1 | 5/2020 | Ginder |
| 2020/0147837 A1 | 5/2020 | Kao |
| 2020/0165525 A1 | 5/2020 | Grau Garcia et al. |
| 2020/0190729 A1 | 6/2020 | Nakamura et al. |
| 2020/0223746 A1 | 7/2020 | Cao et al. |
| 2020/0246923 A1 | 8/2020 | Haight |
| 2020/0299476 A1 | 9/2020 | Aizawa et al. |
| 2020/0316892 A1 | 10/2020 | Gu et al. |
| 2020/0317879 A1 | 10/2020 | Stein et al. |
| 2020/0339777 A1 | 10/2020 | Liao et al. |
| 2020/0340207 A1 | 10/2020 | Denson et al. |
| 2020/0378034 A1 | 12/2020 | Cho et al. |
| 2020/0399462 A1 | 12/2020 | Misumi et al. |
| 2020/0407518 A1 | 12/2020 | Yoshioka et al. |
| 2021/0017675 A1 | 1/2021 | Mercader et al. |
| 2021/0024747 A1 | 1/2021 | D'achille et al. |
| 2021/0031409 A1 | 2/2021 | Patlolla |
| 2021/0032419 A1 | 2/2021 | Oka et al. |
| 2021/0032432 A1 | 2/2021 | Manas-Zloczower et al. |
| 2021/0032803 A1 | 2/2021 | Jeong et al. |
| 2021/0069995 A1 | 3/2021 | Veit et al. |
| 2021/0130538 A1 | 5/2021 | Inadome et al. |
| 2021/0291464 A1 | 9/2021 | Shin |
| 2023/0010075 A1 | 1/2023 | Guan et al. |
| 2023/0211391 A1 | 7/2023 | Kendall et al. |

FOREIGN PATENT DOCUMENTS

| | | | | |
|---|---|---|---|---|
| CN | 207757920 U | 8/2018 | | |
| CN | 208343226 U | 1/2019 | | |
| CN | 109895284 A | 6/2019 | | |
| CN | 110181717 A | 8/2019 | | |
| CN | 107932791 B | 11/2019 | | |
| CN | 209613097 U | 11/2019 | | |
| CN | 210207006 U | 3/2020 | | |
| CN | 210207109 U | 3/2020 | | |
| CN | 210308588 U | 4/2020 | | |
| CN | 211137792 U | 7/2020 | | |
| CN | 212021327 U | 11/2020 | | |
| CN | 109291321 B | 3/2021 | | |
| CN | 212632813 U | 3/2021 | | |
| CN | 212791132 U | 3/2021 | | |
| CN | 212860061 U | 4/2021 | | |
| DE | 102010046685 | * | 3/2012 | ............ B29B 17/02 |
| DE | 102010046685 B4 | 12/2016 | | |
| DE | 102019007654 A1 | 4/2021 | | |
| EP | 3050689 B1 | 3/2018 | | |
| FR | 2964588 B1 | 10/2012 | | |
| WO | 0189784 A1 | 11/2001 | | |
| WO | 2005002530 A1 | 1/2005 | | |
| WO | 2005040057 A1 | 5/2005 | | |
| WO | 2005049706 A1 | 6/2005 | | |
| WO | 2008119409 A1 | 10/2008 | | |
| WO | 2009150298 A1 | 12/2009 | | |
| WO | 2010149729 A1 | 12/2010 | | |
| WO | 2011095597 A1 | 8/2011 | | |
| WO | 2012010785 A1 | 1/2012 | | |
| WO | 2012085000 A1 | 6/2012 | | |
| WO | 2012118208 A1 | 9/2012 | | |
| WO | 2012136222 A1 | 10/2012 | | |
| WO | 2013007359 A1 | 1/2013 | | |
| WO | 2013076601 A1 | 5/2013 | | |
| WO | 2013079482 A1 | 6/2013 | | |
| WO | 2013107829 A1 | 7/2013 | | |
| WO | 2013168302 A1 | 11/2013 | | |
| WO | 2014020532 A1 | 2/2014 | | |
| WO | 2014060420 A1 | 4/2014 | | |
| WO | 2015072337 A1 | 5/2015 | | |
| WO | 2015094308 A1 | 6/2015 | | |
| WO | 2015097346 A1 | 7/2015 | | |
| WO | 2016091726 A1 | 6/2016 | | |
| WO | 2016095304 A1 | 6/2016 | | |
| WO | 2016177305 A1 | 11/2016 | | |
| WO | 2017078900 A1 | 5/2017 | | |
| WO | 2017078905 A8 | 5/2017 | | |
| WO | 2017167332 A1 | 10/2017 | | |
| WO | 2017191024 A1 | 11/2017 | | |
| WO | 2018015250 A1 | 1/2018 | | |
| WO | 2018075126 A8 | 4/2018 | | |
| WO | 2018165669 B1 | 9/2018 | | |
| WO | 2018175957 A1 | 9/2018 | | |
| WO | 2018206789 A1 | 11/2018 | | |
| WO | 2019079823 A1 | 4/2019 | | |
| WO | 2019101733 A1 | 5/2019 | | |
| WO | 2018075126 A8 | 7/2019 | | |
| WO | 2019163578 A1 | 8/2019 | | |
| WO | 2019194032 A1 | 10/2019 | | |
| WO | 2019210330 A1 | 10/2019 | | |
| WO | 2019212127 A1 | 11/2019 | | |
| WO | 2020014792 A1 | 1/2020 | | |
| WO | 2020028914 A1 | 2/2020 | | |
| WO | 2020031713 A1 | 2/2020 | | |
| WO | 2020040289 A1 | 2/2020 | | |
| WO | 2020045895 A1 | 3/2020 | | |
| WO | 2020066349 A1 | 4/2020 | | |

(56) References Cited

FOREIGN PATENT DOCUMENTS

| | | |
|---|---|---|
| WO | 2020067109 A1 | 4/2020 |
| WO | 2020099364 A1 | 5/2020 |
| WO | 2020100785 A1 | 5/2020 |
| WO | 2020127719 A1 | 6/2020 |
| WO | 2020126744 A3 | 7/2020 |
| WO | 2020179413 A1 | 9/2020 |
| WO | 2020182484 A1 | 9/2020 |
| WO | 2020183018 A1 | 9/2020 |
| WO | 2020186102 A1 | 9/2020 |
| WO | 2020112396 A3 | 10/2020 |
| WO | 2020161538 A9 | 10/2020 |
| WO | 2020229282 A1 | 11/2020 |
| WO | 2020235488 A1 | 11/2020 |
| WO | 2020246144 A1 | 12/2020 |
| WO | 2020255775 A1 | 12/2020 |
| WO | 2020260970 A1 | 12/2020 |
| WO | 2021026198 A1 | 2/2021 |
| WO | 2021030739 A1 | 2/2021 |
| WO | 2021068083 A1 | 4/2021 |
| WO | 2021081154 A1 | 4/2021 |
| WO | 2021191292 A1 | 9/2021 |

OTHER PUBLICATIONS

Amey Engineers, "Engineering Machines", URL: https://www.ameyengineers.com/. Webpage visited Feb. 27, 2024. 2 pages.

Durability Engineers, "Mobile Wind Blade Recycling for Concrete", URL: https://www.youtube.com/watch?v=6UzKfx8qT-k. Sep. 29, 2023. Webpage visited Mar. 24, 2024. 3 pages.

Eco-Wolf, "FRP & Natural Fibers Recycling System", URL: https://www.ecowolfinc.com/frp.php; archived page dated Feb. 15, 2012 URL: https://web.archive.org/web/20120215111348/https://www.ecowolfinc.com/frp.php. Archived webpage visited Feb. 27, 2024. 2 pages.

Georgia Tech Create-X, "Re-Wind USA Company Overview", URL: https://create-x.gatech.edu/company/re-wind-USA. Webpage visited Mar. 24, 2024. 2 pages.

Greentex Solutions, "Circular Mechanical Recycling of Wind Turbines", URL: https://www.youtube.com/watch?v=yEDT6sgPEjo. Sep. 27, 2023. Webpage visited Mar. 24, 2024. 3 pages.

Greentex Solutions, "Executive Summary for IACMA Members Conference", URL: https://iacmi.org/wp-content/uploads/2017/12/Jay-Holmes-GreenTex.pdf. Jul. 25, 2018. Document downloaded Mar. 24, 2024. 11 pages.

Holmes, Jay, "Multiple Stream Low-Cost Recycling Method", https://iacmi.org/wp-content/uploads/2022/05/IACMI-6.27-Final-Project-Report-5.10.22-Approved.pdf. May 10, 2022. Document downloaded Mar. 24, 2024. 21 pages.

Inknowvation, "DOE 2022 Green Composites Fabricated from Bacteria Retted Bast Fiber and PLA for Light Weight Vehicle Components", SBIR-STTR Award. URL: https://www.inknowvation.com/sbir/awards/doe-2022-green-composites-fabricated-bacteria-retted-bast-fiber-and-pla-light-weight. Jan. 14, 2023. Webpage visited Mar. 24, 2024. 3 pages.

IP Office Canada, "Office Action", for Application No. 3,206,393, Mail Date: Dec. 11, 2023, 3 pages.

J.H. Fletcher, "Fletcher Blade Shredder", URL: https://www.youtube.com/watch?v=3T84ZsQFaxo. Webpage visited Mar. 24, 2024. 3 pages.

Lidem, "Cutting and Recycling Machines", URL: https://www.lidem.com/ing/. Webpage visited Feb. 27, 2024. 3 pages.

Ningbo Sinobaler Machinery, "Shredders", URL: https://www.sinoshredder.com/shredding-equipment/shredding-machine/. Webpage visited Feb. 27, 2024. 2 pages.

Pitchbook, "GreenTex Solutions Overview", URL: https://pitchbook.com/profiles/company/100546-12#data. Webpage visited Mar. 24, 2024. 3 pages.

US Dept of Energy, "Wind Energy Technologies Office Wind Turbine Materials Recycling Prize", URL: https://www.energy.gov/eere/wind/wind-turbine-materials-recycling-prize. Jul. 2023. Webpage visited Mar. 24, 2024. 7 pages.

Wanrooetech, "Pulverizers", URL: https://www.wanrooetech-pulverizer.com/. Webpage visited Feb. 27, 2024. 18 pages.

* cited by examiner

Stage 1 - Scalper
Modified tube and slot deck vibration separator
Scalp off most of the balsa and foam from the recycled fiberglass chip

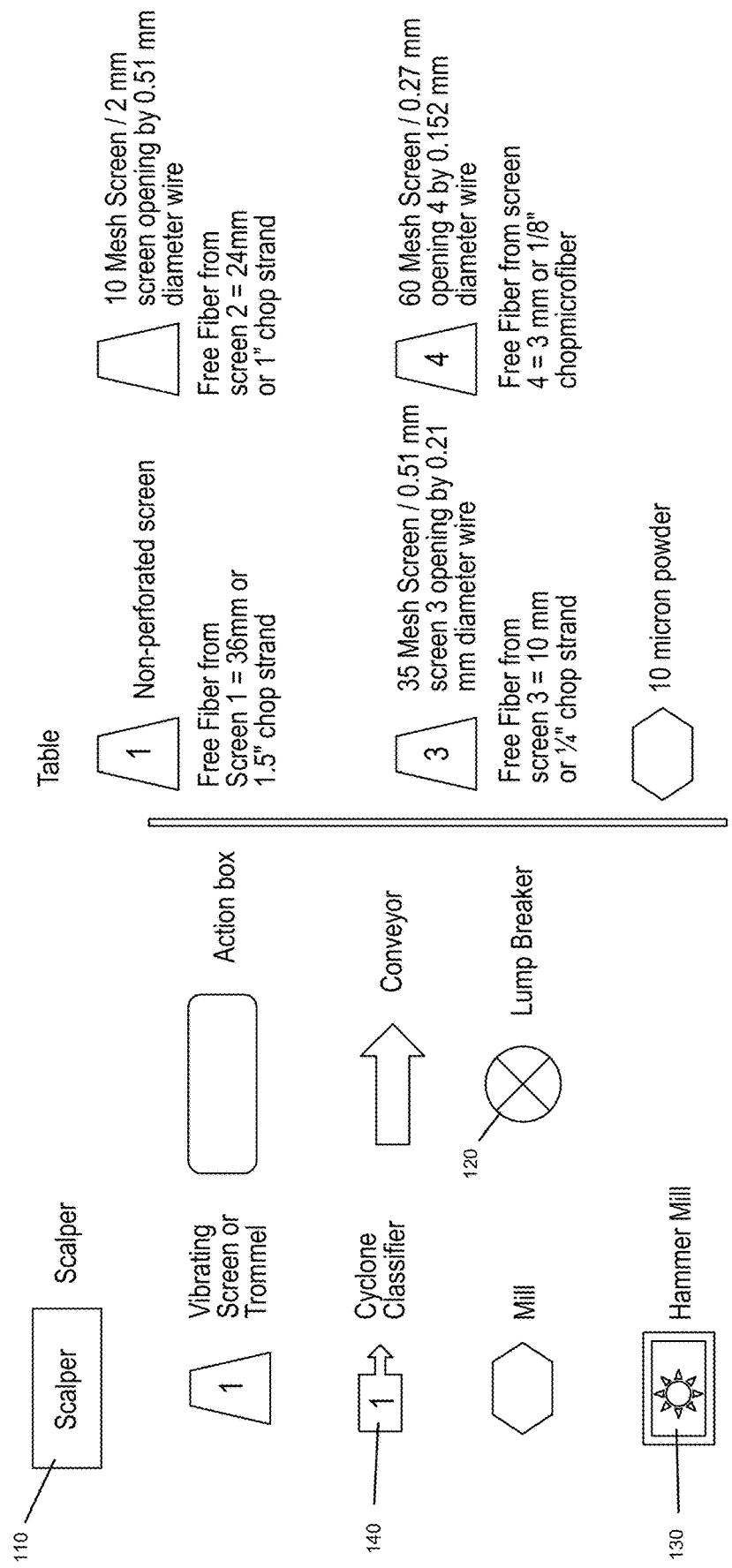

_US 12,053,908 B2_

METHOD AND SYSTEM FOR RECYCLING WIND TURBINE BLADES

CROSS-REFERENCE TO RELATED APPLICATIONS

This patent application claims priority to U.S. Provisional Patent Application No. 63/144,128 filed on Feb. 1, 2021, the entirety of which is incorporated herein fully by reference.

FIELD OF THE DISCLOSURE

This disclosure relates generally to a method and system for recycling wind turbine blades, and in particular to a method and system for processing materials from wind turbine blades to produce reinforcement fibers of various lengths and milled reinforced micro-fibers.

BACKGROUND OF THE DISCLOSURE

Electricity produced by wind turbines, commonly referred to as wind energy, is a promising alternative to electricity produced by fossil fuels. In 2019, wind energy produced approximately 300 billion kWh in the U.S., amounting to about 7.3% of total U.S. utility-scale electricity generation. As of January 2019, there were more than 58,000 wind turbines recorded in the U.S. Wind Turbine Database. Wind turbines typically have a useful life of about ten years.

Wind turbine blades are typically constructed from composite materials. They are primarily fiberglass, and often have an internal structure consisting largely of balsa wood and foam. Despite their promise as a clean energy source, their composite construction makes wind turbine blades difficult to recycle, and many wind turbine blades end up in landfills.

For the reasons stated above, and for other reasons which will become apparent to those skilled in the art upon reading and understanding the specification, there is a need in the art for a method and system for recycling wind turbine blades. Thus, it is a primary object of the disclosure to provide a method and system for recycling wind turbine blades to produce reinforcement fibers and composite fillers.

These and other objects, features, or advantages of the present disclosure will become apparent from the specification and claims.

BRIEF SUMMARY OF THE DISCLOSURE

The disclosure relates to a method and system for recycling wind turbine blades. In one arrangement, a scalper scalps off most of the balsa wood and foam from recycled composite chips, a lump breaker shatters the chips produced by the scalper, a hammer mill breaks fiber chips produced by the lump breaker to reduce the chips to strand clusters, a vibratory screen and cyclone air classifier or circular vibratory screener separate strand clusters of acceptable size from larger strand clusters that require repeated processing with a hammer mill, another vibratory screen and cyclone air classifier or circular vibratory screener further separate strand clusters of acceptable size from larger strand clusters that require repeated processing with a hammer mill, and a granulator pulverizes the resulting fiber strand into micro-fibers that can be used as reinforcement fibers of various lengths and milled reinforced micro-fibers. The terms powder and micro-fibers may be used interchangeably without departing from the scope of the disclosure.

BRIEF DESCRIPTION OF THE DRAWINGS

FIG. 5a depicts a process chart for recycling wind turbine blades according to one embodiment.

DETAILED DESCRIPTION

Figure 1:
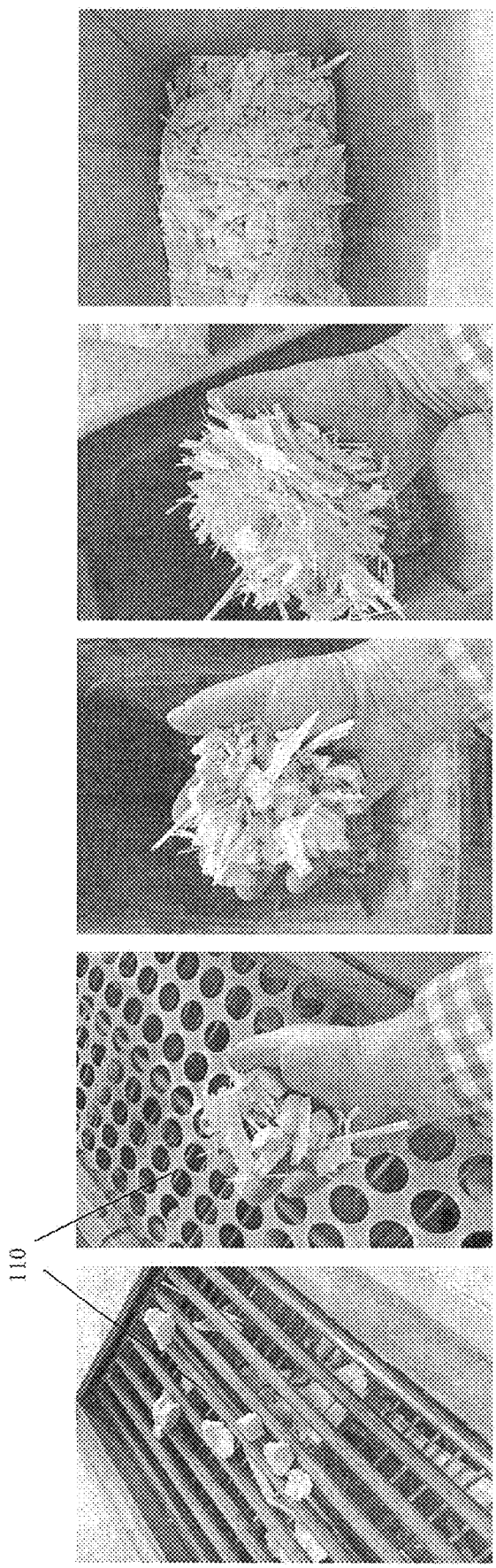
FIG. 1 depicts a scalper for recycling wind turbine blades and scalped fiberglass chips according to one embodiment.
Figure 2:
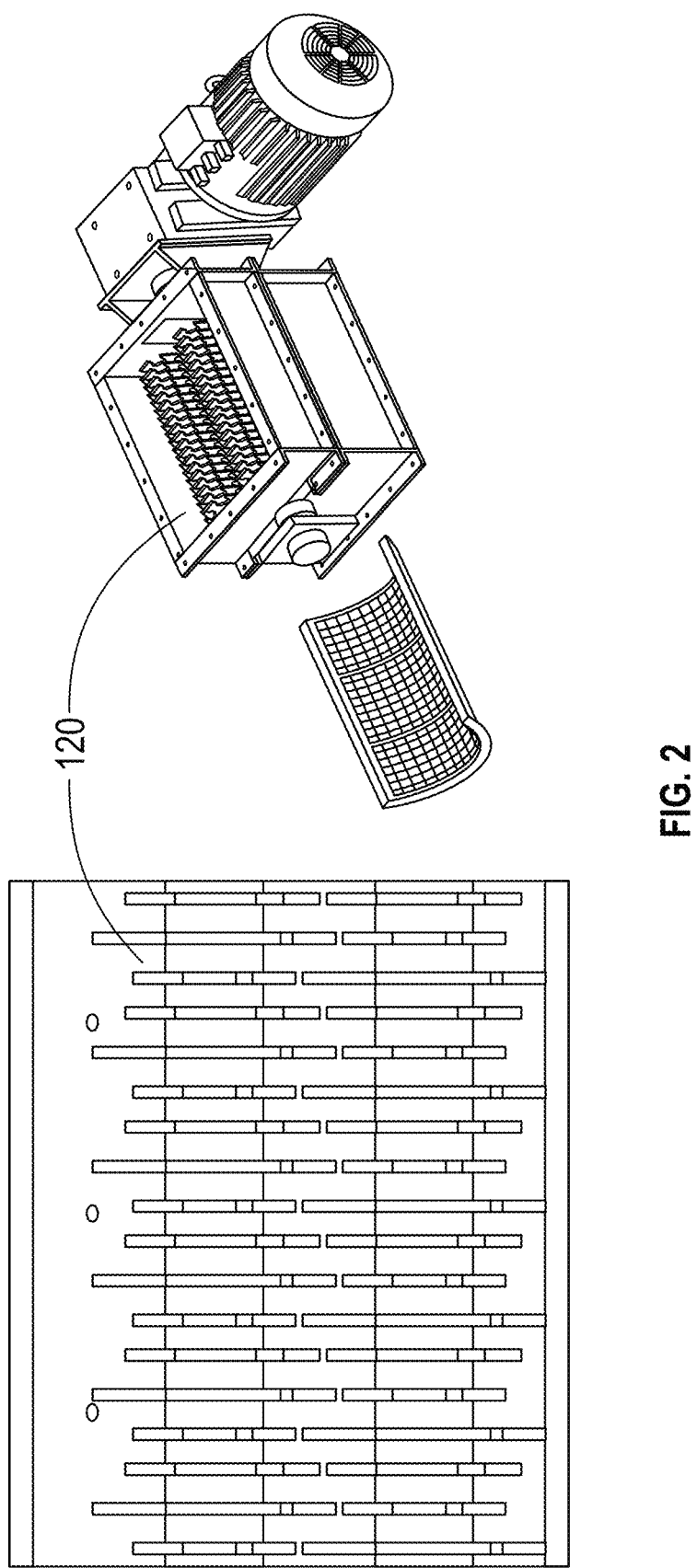
FIG. 2 depicts a lump breaker for recycling wind turbine blades according to one embodiment.
Figure 3:
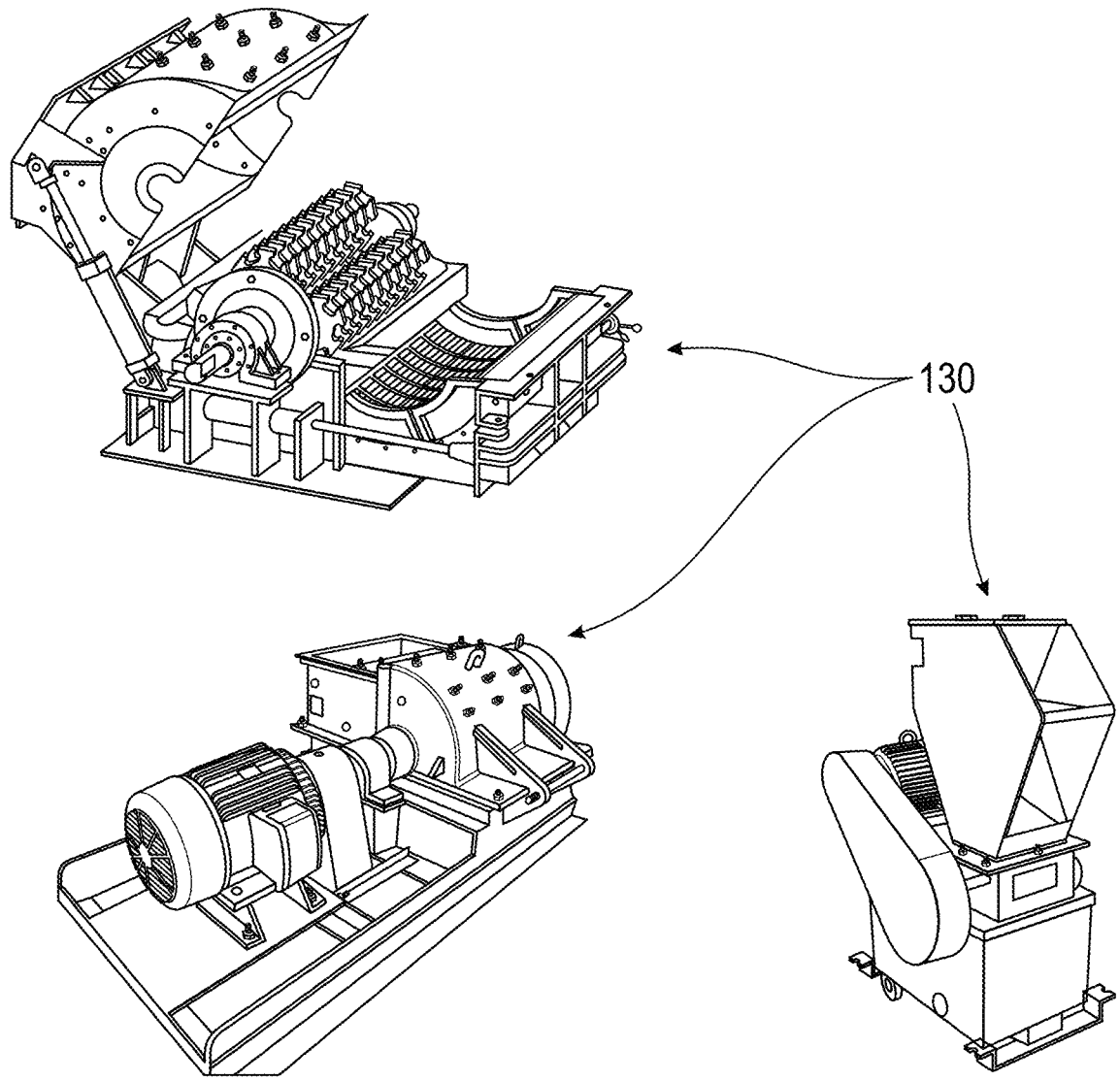
FIG. 3 depicts hammer mills for recycling wind turbine blades according to one embodiment.
Figure 4:
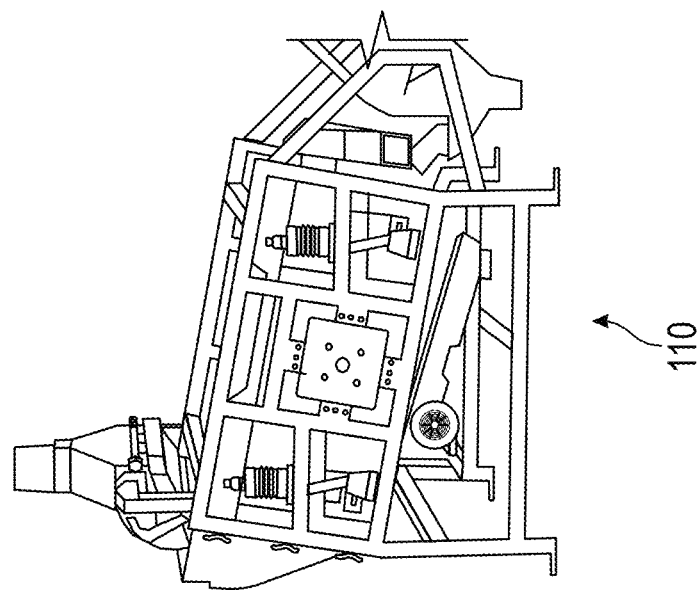
FIG. 4 depicts classifiers for sorting fiber materials in a method for recycling wind turbine blades according to one embodiment.
Figure 4:
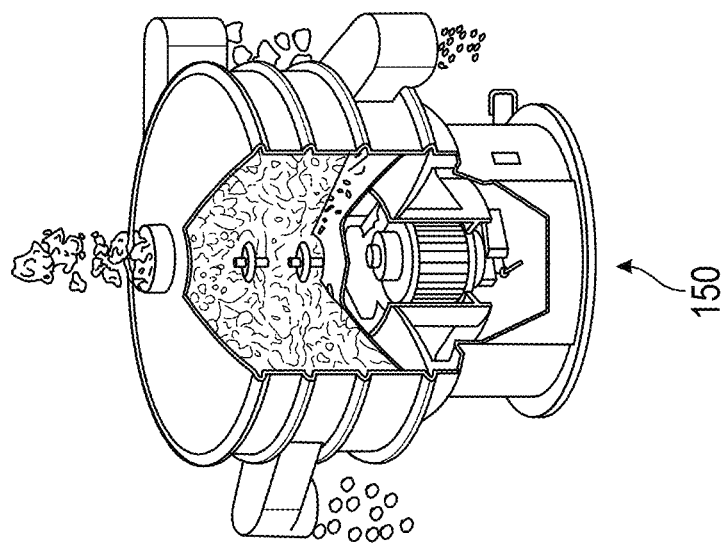
Figure 4:
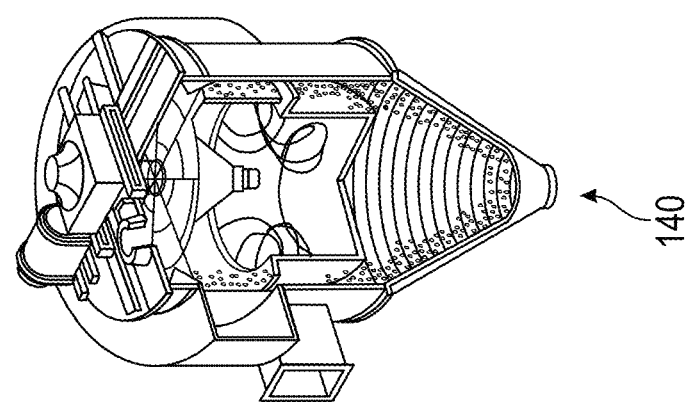
Figure 5B:
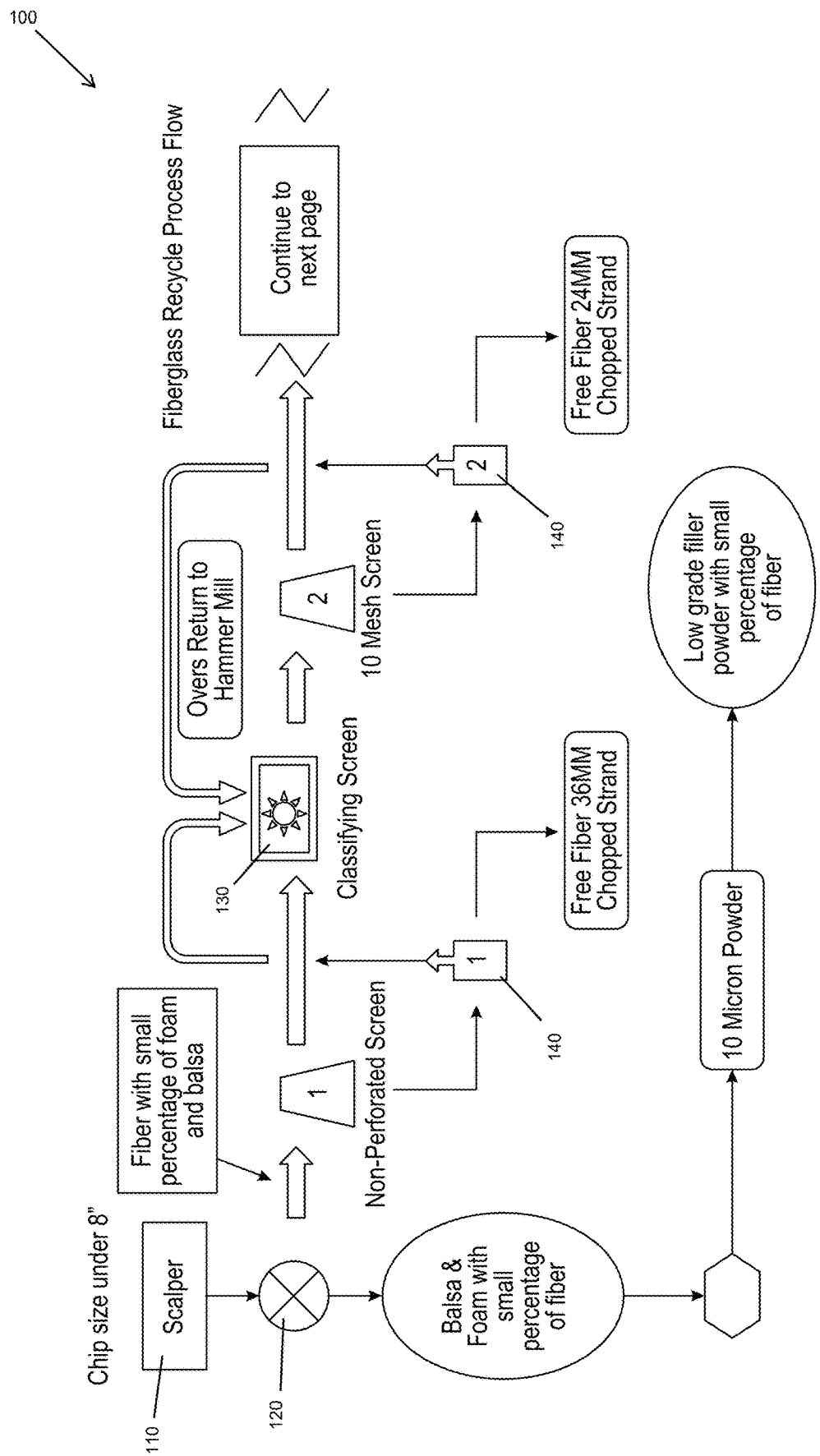
FIG. 5b depicts a process chart for recycling wind turbine blades according to one embodiment.
Figure 5C:
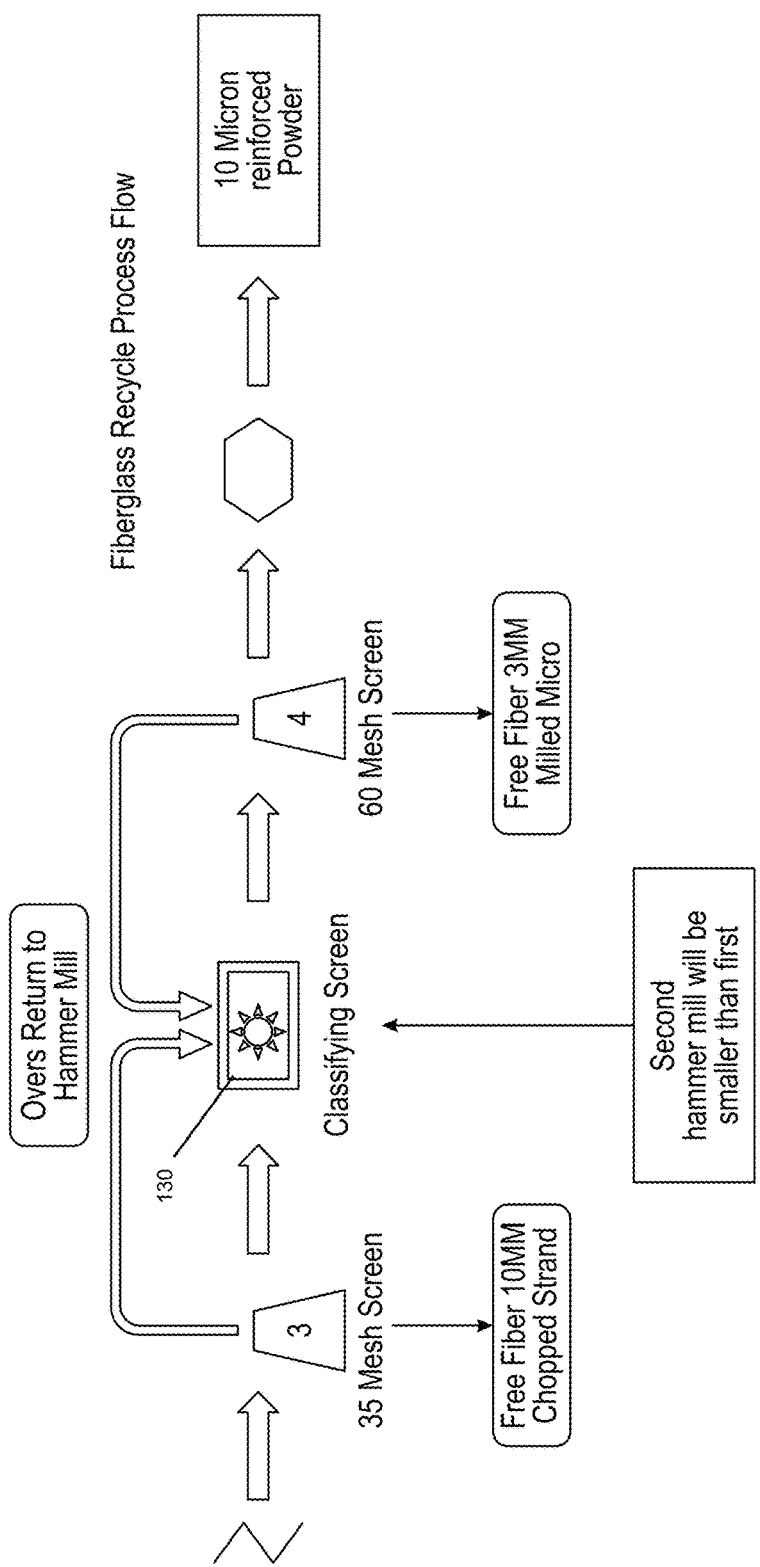
FIG. 5c depicts a process chart for recycling wind turbine blades according to one embodiment.

In the following detailed description of the embodiments, reference is made to the accompanying drawings which form a part hereof, and in which is shown by way of illustration specific preferred embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosures. The following detailed description is, therefore, not to be taken in a limiting sense, and the scope of the present disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

System for Recycling Wind Turbine Blades 100

A system for recycling wind turbine blades 100 comprises a series of machines configured to process shredded chips ranging from 4"×4" to 8"×8" that may contain balsa wood, foam, or other materials used in wind turbine blade construction into fiberglass micro-fibers or fiber strand ⅛" or finer that is suitable for use as a reinforcement fiber or composite filler. As shown in FIGS. 1-4, processing equipment used in system 100 may include one or more scalpers 110, one or more lump breakers 120, one or more hammer mills 130, and one or more cyclone classifiers 140 or vibratory screens 150.

Scalper 110

System 100 may comprise one or more scalpers 110. Scalper 110 may comprise a modified tube and slot deck vibration separator. Scalper 110 scalps off most of the balsa and foam from the recycled fiberglass chip.

Lump Breaker 120

System 100 may comprise one or more lump breakers 120. After being processed by scalper 110, chips may be conveyed from the scalper 110 to the lump breaker 120. Lump breaker 120 is configured to shatter chips into smaller sized chips to be processed by other components of system 100. In one embodiment, lump breaker 120 uses a screen size of at least 2 inch passing.

Hammer Mill 130

System 100 may comprise one or more hammer mills 130. Hammer mill 130 is configured to break up all fiber chips into smaller sizes, and may be used to free fibers from the composite and reduce the chips to strand clusters.

Vibratory Screen 150

A vibratory screen 150 may also be referred to as a circular vibratory screen 150, vibrating screen 150, or trommel 150. Vibratory screen 150 is configured to separate fibers of a particular size from larger pieces. Vibratory screen 150 may be equipped with screens of various sizes to separate different sizes of fibers. Vibratory screen 150 may be equipped with a non-perforated screen in which free fiber from the screen is 36 mm or 1.5 inch chop strand or smaller. Vibratory screen 150 may be equipped with a 10 mesh screen having 2 mm screen openings and 0.51 mm diameter wire and in which free fiber from the screen is 24 mm or 1 inch chop strand or smaller. Vibratory screen 150 may be equipped with a 35 mesh screen having 0.51 mm screen openings and 0.21 mm diameter wire and in which free fiber from the screen is 10 mm or ¼ inch chop strand or smaller. Vibratory screen 150 may be equipped with a 60 mesh screen having 0.27 mm screen openings and 0.152 mm diameter wire and in which free fiber from the screen is 3 mm or ⅛ inch chop strand or smaller.

Method for Recycling Wind Turbine Blades 200

A method 200 for recycling or upcycling wind turbine blades is presented. The method 200 comprises multiple stages in which materials taken from wind turbine blades are processed into progressively finer materials. The materials produced by each stage of the method 200 each have a use in the composite industry or in the non-composite industry. After any stage of method 200, the materials produced in that stage may be extracted and used, or the materials produced in that stage may proceed to the next stage of the method 200.

First Stage 210 of a Method for Recycling Wind Turbine Blades 200

Figure 6:
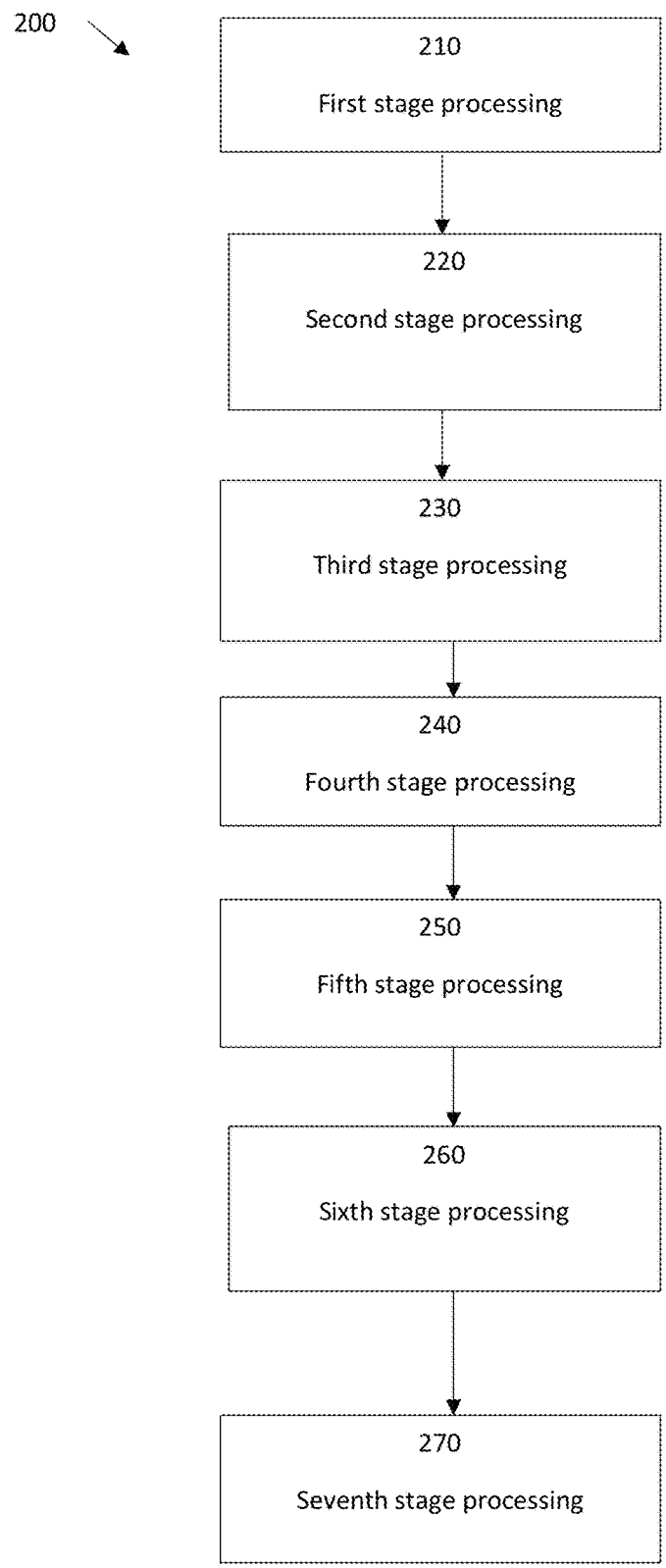
FIG. 6 depicts a method for recycling wind turbine blades according to one embodiment.

As shown in FIG. 6, a method for recycling wind turbine blades 200 begins at step 210. In a first stage 210 of a method for recycling wind turbine blades 200, shredded fiberglass chips ranging in size from 4×4 inches to 8×8 inches are inserted into scalper 110, which removes most of the balsa wood, foam, and other non-fiberglass materials from the input chips. Balsa wood and foam with trace amounts of fiber that have been scalped off by scalper 110 may be run through a granulator or mill that pulverizes the balsa wood and foam into 10-micron composite micro-fibers that may be used as low grade filler micro-fibers. After processing with scalper 110, the processed chips with trace amounts of balsa wood and foam may be extracted and used or may be conveyed to a lump breaker 120 for processing in a second stage 220 of a method for recycling wind turbine blades 200.

Second Stage 220 of a Method for Recycling Wind Turbine Blades 200

In a second stage 220 of a method for recycling wind turbine blades 200, processed chips resulting from the first stage 210 are conveyed from the scalper 110 to a lump breaker 120. Lump breaker 120 shatters the chips resulting from the first stage 210 and shatters them into 2×2 inch chips. The resulting shattered 2×2 inch chips are run through a non-perforated vibratory screen configured to separate chips that are larger than 2×2 inches and chips that are smaller than 2×2 inches in size. Chips that are smaller than 2×2 inches are routed to a cyclone air classifier 140, which may alternatively be referred to as a cyclone classifier 140, or a circular vibratory screener 150 configured to separate fiber strands that are 1.5 inches (36 mm) or less from larger chips that are conveyed to hammer mill 130 for processing in a third stage 230 of a method for recycling wind turbine blades 200. After undergoing the second stage 220, the second stage chips may be extracted and used or may be conveyed to the third stage 230.

Third Stage 230 of a Method for Recycling Wind Turbine Blades 200

In a third stage 230 of a method for recycling wind turbine blades 200, the larger chips classified by the cyclone classifier 140 or circular vibratory screener 150 during the second stage 220 are conveyed to a hammer mill 130 configured to break up all fiber chips into smaller sizes; thus freeing fibers from the composite and reducing the chips to strand clusters. After undergoing the third stage 230, the third stage chips may be extracted and used or may be conveyed to the fourth stage 240.

Fourth Stage 240 of a Method for Recycling Wind Turbine Blades 200

In a fourth stage 240 of a method for recycling wind turbine blades 200, fiber strand clusters resulting from third stage 230 processing are conveyed to a vibratory screen and then processed through a cyclone air classifier 140 or a circular vibratory screener 150 equipped with a 10 mesh screen configured to separate chop strands that are 1 inch (24 mm) or less from larger pieces that are returned to hammer mill 130 for further processing. All chop strands or fine fiber clusters that are 1 inch or less may be extracted and used or may be conveyed to the fifth stage 250.

Fifth Stage 250 of a Method for Recycling Wind Turbine Blades 200

In a fifth stage 250 of a method for recycling wind turbine blades 200, fine fiber clusters 1 inch or less in size separated out in the fourth stage 240 are conveyed to a vibratory screen and then processed through a cyclone air classifier 140 or a circular vibratory screener 150 equipped with a 35 mesh screen and configured to separate chop strands that are ¼ inch (10 mm) or less from larger pieces that are returned to hammer mill 130 with specific screens for reducing the balance of fiber materials to ¼ inch to ⅛ inch fiber. The hammer mill 130 used at this stage of processing will be smaller than the hammer mill 130 used in earlier stages of processing. After undergoing the fifth stage 250, the fifth stage chips may be extracted and used or may be conveyed to the sixth stage 260.

Sixth Stage 260 of a Method for Recycling Wind Turbine Blades 200

In a sixth stage 260 of a method for recycling wind turbine blades 200, fine fiber clusters ¼ inch or less in size separated out in the fifth stage 250 are conveyed to a vibratory screen and then processed through a cyclone air classifier 140 or a circular vibratory screener 150 equipped with a 60 mesh screen and configured to separate chop strands that are ⅛ inch (3 mm) or less (which are referred to as milled glass) from larger pieces that are returned to hammer mill 130 with specific screens for reducing the balance of fiber materials to ¼ inch to ⅛ inch fiber. After undergoing the sixth stage 260, the sixth stage chips may be extracted and used or may be conveyed to the seventh stage 270.

Seventh Stage 270 of a Method for Recycling Wind Turbine Blades 200

In a seventh stage 270 of a method for recycling wind turbine blades 200, all micro-fibers or fiber strand that is ⅛ inch in size or smaller is run through a granulator or mill to pulverize the fine fiber strand into micro-fibers. In one embodiment, the resulting micro-fibers comprise 10 micron reinforced micro-fibers.

Through implementation of method 200, reinforcement fiber of various lengths and milled reinforced micro-fibers are produced. In one embodiment, reinforcement fibers may range in length from 1/16 inch to 3 inches; however, other lengths of reinforcement fibers may also be produced without departing from the scope of the invention.

The system 100 and method 200 has many benefits and advantages including, but not limited to reducing the number of wind turbine blades placed in landfills and providing reinforcement fiber and milled reinforced micro-fibers alternatives that do not require new materials. These and other benefits and advantages of the system 100 and method 200 are apparent from the specification and claims.

REFERENCE NUMERALS

- 100—system for recycling wind turbine blades
- 110—scalper
- 120—lump breaker
- 130—hammer mill
- 140—cyclone air classifier or cyclone classifier
- 150—vibratory screen or vibrating screen or circular vibratory screen or trommel
- 200—a method for recycling wind turbine blades
- 210—first stage a method for recycling wind turbine blades 200
- 220—second stage of a method for recycling wind turbine blades 200
- 230—third stage of a method for recycling wind turbine blades 200
- 240—fourth stage of a method for recycling wind turbine blades 200
- 250—fifth stage of a method for recycling wind turbine blades 200
- 260—sixth stage of a method for recycling wind turbine blades 200
- 270—seventh stage of a method for recycling wind turbine blades 200

What is claimed:

1. A method of processing a wind turbine blade including fiberglass, balsa wood, and foam materials to produce reinforcement fibers and composite fillers, the method comprising:
   (a) receiving the wind turbine blade in a form of shredded composite chips, wherein the chips have sizes between four by four inches and eight by eight inches;
   (b) in a first stage, scalping the composite chips to separate the balsa wood and the foam from the fiberglass to produce fiberglass chips and separated balsawood and foam; and
   (c) in one or more additional stages, repeatedly breaking the fiberglass chips into smaller pieces and separating larger pieces from smaller pieces.

2. The method of claim 1 further comprising extracting the fiberglass chips.

3. The method of claim 1 further comprising pulverizing the separated balsa wood and foam.

4. The method of claim 3 wherein the pulverized separated balsa wood and foam are suitable for use as a composite filler material.

5. The method of claim 1, wherein the one or more additional stages comprises a second stage, wherein the second stage comprises shattering the fiberglass chips to produce second stage fiberglass chips that are two square inches or smaller and separating 1.5 inch or smaller fiber strands from the second stage fiberglass chips.

6. The method of claim 5 further comprising extracting the second stage fiberglass chips.

7. The method of claim 5, wherein the one or more additional stages comprises a third stage, wherein the third stage comprises breaking the 1.5 inch or smaller fiber strands to produce third stage strand clusters.

8. The method of claim 7 further comprising extracting the third stage strand clusters.

9. The method of claim 7, wherein the one or more additional stages comprises a fourth stage, wherein the fourth stage comprises separating one inch or smaller chop strands from the third stage strand clusters to produce fourth stage fine fiber clusters.

10. The method of claim 9 further comprising extracting the fourth stage fine fiber clusters.

11. The method of claim 9, wherein the one or more additional stages comprises a fifth stage, wherein the fifth stage comprises separating 1/4 inch or smaller chop strand from the fourth stage fine fiber clusters to produce fifth stage chop strand.

12. The method of claim 11 further comprising extracting the fifth stage chop strand.

13. The method of claim 11, wherein the one or more additional stages comprises a sixth stage, wherein the sixth stage comprises separating 1/8 inch or smaller chop strand from the fifth stage chop strand to produce sixth stage fiber materials ranging from 1/4 inch to 1/8 inch fiber.

14. The method of claim 13 further comprising extracting the sixth stage fiber materials.

15. The method of claim 13 further comprising pulverizing the 1/4 inch to 1/8 inch fiber to produce seventh stage micro-fibers.

16. The method of claim 15 wherein the seventh stage micro-fibers are suitable for use as a reinforcement fiber.

17. The method of claim 15 wherein the seventh stage micro-fibers are suitable for use in the composite industry.

18. The method of claim 15 wherein the seventh stage micro-fibers are suitable for use in the non-composite industry.

* * * * *